United States Patent
Amer

(10) Patent No.: US 8,107,357 B2
(45) Date of Patent: *Jan. 31, 2012

(54) OPTIMIZED FFT/IFFT MODULE

(75) Inventor: Maher Amer, Nepean (CA)

(73) Assignee: Zarbana Digital Fund LLC, Wilmington, DE (US)

( * ) Notice: Subject to any disclaimer, the term of this patent is extended or adjusted under 35 U.S.C. 154(b) by 1069 days.

This patent is subject to a terminal disclaimer.

(21) Appl. No.: 11/964,510

(22) Filed: Dec. 26, 2007

(65) Prior Publication Data

US 2008/0172436 A1  Jul. 17, 2008

Related U.S. Application Data

(63) Continuation of application No. 10/662,063, filed on Sep. 12, 2003, now Pat. No. 7,333,422.

(51) Int. Cl.
*H04J 11/00* (2006.01)
*H04L 27/00* (2006.01)
*H04B 7/204* (2006.01)
*G06F 17/14* (2006.01)

(52) U.S. Cl. ........ 370/210; 370/208; 370/211; 370/215; 370/319; 370/503; 375/147; 375/344; 375/355; 708/321; 708/404

(58) Field of Classification Search .......... 370/208–503; 375/147–355; 708/321–404
See application file for complete search history.

(56) References Cited

U.S. PATENT DOCUMENTS

| | | | | |
|---|---|---|---|---|
| 4,117,541 A * | 9/1978 | Ali | ........ | 708/320 |
| 4,138,730 A * | 2/1979 | Ali | ........ | 708/404 |
| 4,199,660 A * | 4/1980 | Dill et al. | ........ | 370/307 |
| 4,199,809 A * | 4/1980 | Pasahow et al. | ........ | 370/210 |
| 5,270,953 A * | 12/1993 | White | ........ | 708/321 |
| 6,118,758 A * | 9/2000 | Marchok et al. | ........ | 370/210 |
| 6,175,550 B1 | 1/2001 | Van Nee | | |
| 6,175,551 B1 | 1/2001 | Awater et al. | | |
| 6,470,030 B1 * | 10/2002 | Park et al. | ........ | 370/480 |
| 6,804,192 B1 * | 10/2004 | Marchok et al. | ........ | 370/210 |
| 6,856,590 B2 * | 2/2005 | Okada et al. | ........ | 370/208 |
| 6,898,415 B2 * | 5/2005 | Berliner et al. | ........ | 455/63.1 |
| 6,940,807 B1 * | 9/2005 | Rezvani et al. | ........ | 370/210 |
| 6,944,119 B1 | 9/2005 | Sudo et al. | | |
| 6,985,919 B2 * | 1/2006 | Yu et al. | ........ | 708/404 |
| 7,068,593 B2 | 6/2006 | Cho et al. | | |
| 7,075,949 B2 * | 7/2006 | Okada et al. | ........ | 370/510 |
| 7,197,525 B2 * | 3/2007 | Stein et al. | ........ | 708/409 |
| 7,333,422 B2 * | 2/2008 | Amer | ........ | 370/210 |
| 7,693,034 B2 * | 4/2010 | Singh et al. | ........ | 370/208 |
| 7,801,228 B2 * | 9/2010 | Lehne et al. | ........ | 375/260 |

(Continued)

*Primary Examiner* — Ayaz Sheikh
*Assistant Examiner* — Venkatesh Haliyur
(74) *Attorney, Agent, or Firm* — Stolowitz Ford Cowger LLP

(57) ABSTRACT

We disclose an optimal hardware implementation of the FFT/IFFT operation that minimizes the number of clock cycles required to compute the FFT/IFFT while at the same time minimizing the number of complex multipliers needed. An input module combines a plurality of inputs after applying a multiplication factor to each of the inputs. At least one multiplicand generator generates multiplicands. At least two complex multiplier modules perform complex multiplications with at least one of the complex multiplier modules receiving an output from the input module. A map module receives outputs of the at least two complex multiplier modules, the map module selecting and applying a multiplication factor to each of the outputs received to generate multiple outputs. Finally, an accumulation module receives and performs an accumulation task on each of the multiple outputs of the map module thereby generating a corresponding number of multiple outputs.

27 Claims, 5 Drawing Sheets

U.S. PATENT DOCUMENTS

| | | | |
|---|---|---|---|
| 7,898,935 B2* | 3/2011 | Marchok et al. | 370/210 |
| 2002/0003773 A1* | 1/2002 | Okada et al. | 370/208 |
| 2002/0034214 A1* | 3/2002 | Okada et al. | 375/147 |
| 2003/0204544 A1* | 10/2003 | Yu et al. | 708/404 |
| 2004/0111227 A1* | 6/2004 | Stein et al. | 702/77 |
| 2005/0058059 A1* | 3/2005 | Amer | 370/210 |
| 2007/0078661 A1* | 4/2007 | Sriram et al. | 704/501 |
| 2008/0172436 A1* | 7/2008 | Amer | 708/404 |

* cited by examiner

OPTIMIZED FFT/IFFT MODULE

CROSS-REFERENCE TO RELATED APPLICATION

This application claims priority to and is a continuation of U.S. application Ser. No. 10/662,063, filed Sep. 12, 2003 now U.S. Pat. No. 7,333,422, the entire disclosure of which we incorporate by reference.

FIELD OF INVENTION

This invention relates to OFDM systems and, more particularly, to an optimized hardware implementation of the FFT/IFFT module which minimizes the number of clock cycles for computing the FFT/IFFT of a signal.

BACKGROUND OF THE INVENTION

Wireless LAN (WLAN) technology is one of the most widely deployed and most rapidly expanding areas of radio communications. As demand for mobile data grows, networks will have to offer more bandwidth to support both a larger numbers of users as well as higher data transfer rates for individual users. Satisfying these demands involves the deployment of newer air interface technologies such as 3G cellular and the IEEE 802.11a standard.

The IEEE 802.11a standard is based on a multicarrier modulation scheme called orthogonal frequency domain multiplexing (OFDM) in the 5 GHz band. In multicarrier modulation, data signals (bits) are modulated onto a number of carriers rather than on a single carrier as in traditional AM or FM systems. The result is an optimum usage of bandwidth. The basic principle of OFDM is to split a high rate data stream into a number of lower rate streams, which are then transmitted simultaneously over a number of sub-carriers (overlapping, orthogonal narrow band signals). The frequencies used in OFDM are orthogonal. Neighboring frequencies with overlapping spectrum can therefore be used. This results in a more efficient usage of bandwidth. OFDM is therefore able to provide higher data rates for the same bandwidth. It also offers several advantages over single carrier systems such as better multi-path effect immunity, simpler channel equalization and relaxed timing acquisition constraints. Accordingly, OFDM has become the modulation method of choice for many new systems.

Each sub-carrier in OFDM has a fixed phase and amplitude for a certain time duration, during which a small portion of the information is carried. This unit of data is called a symbol and the time period during which the symbol is available is called the symbol duration. After that time period, the modulation is changed and the next symbol carries the next portion of information. A set of orthogonal sub-carriers together forms an OFDM symbol. To avoid inter symbol interference (ISI) due to multi-path propagation, successive OFDM symbols are separated by a guard band. This makes the OFDM system resistant to multi-path effects. Although OFDM has been in existence for a long time, recent developments in DSP and VLSI technologies have made it a feasible option. As a result, OFDM is fast gaining popularity in broadband standards and high-speed wireless LAN standards such as the IEEE 802.11a.

In practice, the most efficient way to generate the sum of a large number of sub-carriers is by using the Inverse Fast Fourier Transform (IFFT). At the receiver side, a fast and efficient implementation of the well known discrete fourier transform (DFT) function called the Fast Fourier Transform (FFT) can be used to demodulate all the sub-carriers. All sub-carriers differ by an integer number of cycles within the FFT integration time, which ensures the orthogonality between different sub-carriers.

Several choices are available for implementing an OFDM modem: digital signal processing (DSP) based implementation, DSP-based implementation with hardware accelerators or a complete ASIC implementation.

High performance digital signal processors (DSPs) are widely available in the market today. The computation intensive and time critical functions that were traditionally implemented in hardware are nowadays being implemented in software running on these processors. However, a DSP-based implementation of an OFDM modem has the disadvantage of not being very optimum in terms of chip area occupied and power consumption.

To overcome limitations incurred with a DSP-based implementation while still retaining the flexibility of a software implementation, some blocks of an OFDM transceiver can be implemented in hardware. Alternatively, the entire functionality may be implemented in hardware. Advantages of this ASIC-based approach include lower gate count and hence, lower cost and lower power consumption.

When general purpose DSP chips do not meet the required performance parameters of an application, an ASIC (application specific integrated circuit) DSP may be developed. When a particular algorithm has to be implemented, for example the FFT/IFFT algorithm, an application specific DSP chip is generated with an architectural structure dependent upon the algorithm's computational structure. Alternatively, the algorithm can be restructured to better fit an available target architecture (for example, that of a parallel computational arrangement). Most current implementations of the FFT/IFFT engine for an OFDM modem are done using a DSP chip with software and concentrate on minimizing calls to the multiplier block.

However, it would be advantageous to implement an FFT/IFFT engine entirely in ASIC technology so that each of the functional blocks of the FFT/IFFT engine be mapped onto dedicated, parallel hardware resources thereby avoiding the difficult programming and optimization challenges of scheduling time-critical operations through a single DSP core. An optimized hardware implementation which minimizes the total run time while at the same time minimizing the number of complex multiplier is, therefore, sought.

SUMMARY OF THE INVENTION

The present invention pertains to symbolic or mathematical manipulation of the FFT/IFFT formula in order to derive an optimal hardware implementation. The invention involves restructuring the FFT/IFFT formula to minimize the number of clock cycles required to compute the FFT/IFFT while at the same time minimizing the number of complex multipliers required.

According to one embodiment of the present invention, a system for performing an N-point FFT/IFFT operation is provided comprising an input module for receiving a plurality of inputs in parallel and for combining said inputs after applying a multiplication factor to each of said inputs, at least one multiplicand generator for providing multiplicands to said system, at least two multiplier modules for performing complex multiplications, at least one of said multiplier modules receiving an output of said input module, each of said multiplier modules receiving multiplicands from said at least one multiplicand generator, at least one of said multiplier modules receiving an output of another multiplier module, a map module for receiving outputs of all of said at least two multiplier modules, said map module selecting and applying a multiplication factor to each of said outputs of said at least two multiplier modules, said map module generating multiple outputs and an accumulation module for receiving and accumulating said multiple outputs of said map module.

In accordance with an aspect of the present invention, an N-point FFT/IFFT operation, with N being the number of input samples, may be performed in N clock cycles using $$\left(\frac{N}{16}+1\right)$$

complex multipliers. In accordance with a preferred aspect of the present invention, an N-point FFT/IFFT operation is performed in N clock cycles using $$\left(\frac{N}{32}+1\right)$$

complex multipliers. Accordingly, in a preferred implementation of the present invention, an optimized hardware configuration comprising 3 complex multipliers is used to compute a 64-point FFT/IFFT operation in 64 clock cycles. Advantageously, the total number of clock cycles required to complete the FFT/IFFT operation is minimized while at the same time minimizing the number of complex multipliers needed.

The advantage of implementing an FFT/IFFT engine with ASIC technology is that each of the functional blocks of the FFT/IFFT engine be mapped onto dedicated, parallel hardware resources thereby avoiding the difficult programming and optimization challenges of scheduling time-critical operations through a single DSP core.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

A better understanding of the invention will be obtained by considering the detailed description below, with reference to the following drawings in which.

DESCRIPTION OF THE PREFERRED EMBODIMENT

Figure 1:
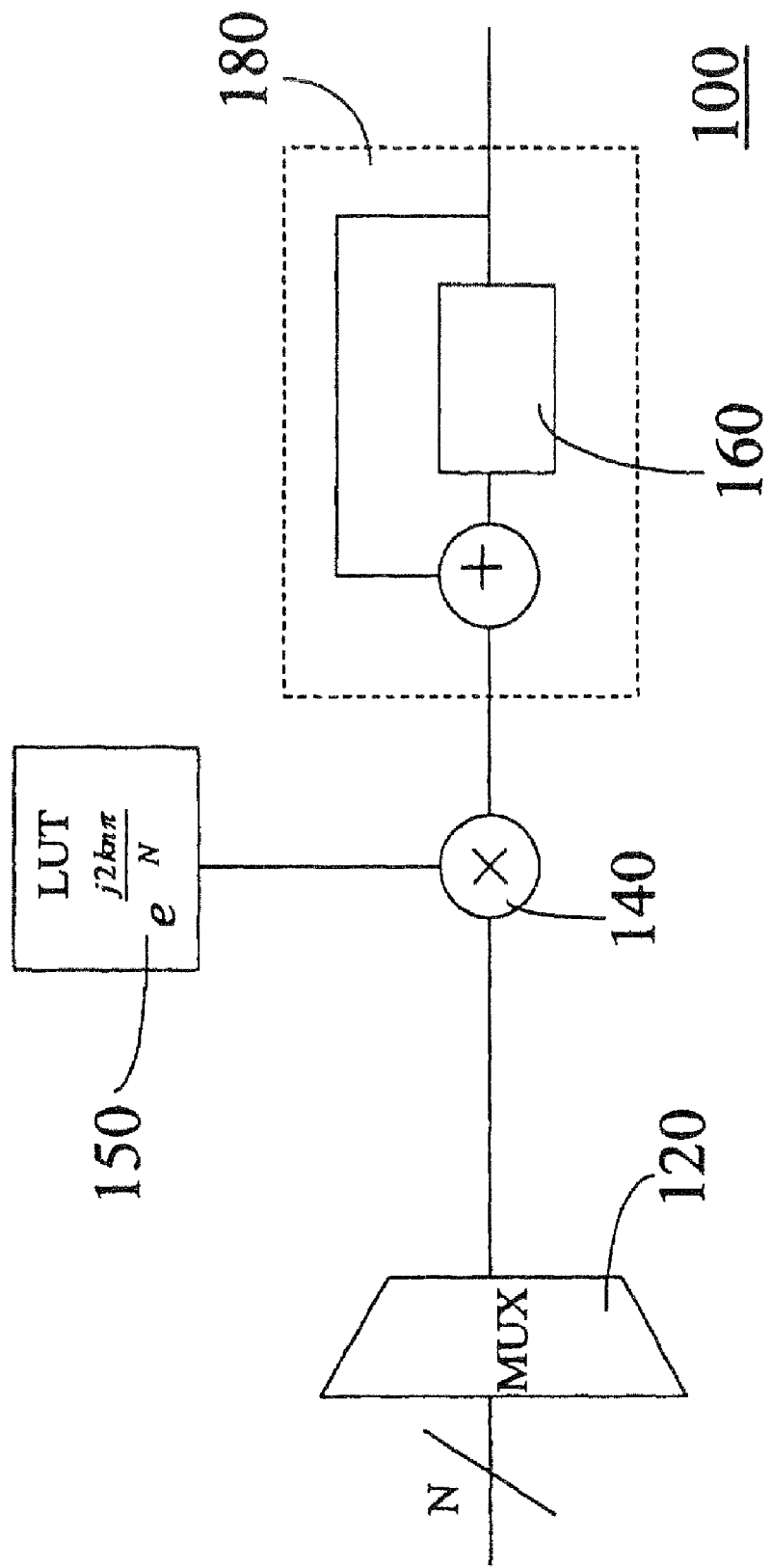
FIG. 1 depicts a brute force hardware implementation for the FFT/IFFT operation.

The basic principle of OFDM is to split a high rate data stream into a number of lower rate streams each of which are transmitted simultaneously over a number of sub-carriers. In the IEEE 802.11a standard OFDM modulation scheme, the binary serial signal is divided into groups (symbols) of one, two, four or six bits, depending on the data rate chosen, and the symbols are converted into complex numbers representing applicable constellation points. Each symbol, having a duration of 4 microseconds, is assigned to a particular sub-carrier. An Inverse Fast Fourier Transform (IFFT) combines the sub-carriers to form a composite time-domain signal for transmission. The IEEE 802.11a standard system uses 52 sub-carriers that are modulated using binary or quadrature phase shift keying (BPSK/QPSK), 16 Quadrature Amplitude Modulation (QAM) or 64 QAM. On the receiver side, the Fast Fourier Transform (FFT) can be used to demodulate all sub-carriers. All sub-carriers differ by an integer number of cycles within the FFT integration time, and this ensures the orthogonality between the different sub-carriers.

The heart of an OFDM baseband processor is, therefore, the FFT/IFFT engine. It is well known that the FFT operation is designed to perform complex multiplications and additions, even though the input data may be real valued. The reason for this situation is that the phase factors are complex and, hence, after the first stage of the operation all variables are complex-valued. Thus, in terms of a hardware implementation, the FFT operation can be implemented using summation modules and multiplication modules (multipliers).

Multiplication modules are the most widely used circuit in an OFDM modem. However, multipliers are costly resources both in terms of chip area and power consumption. A greater number of multipliers will require greater chip area resulting in bulkier devices not suitable for mobile applications. However, the total time it takes for an FFT/IFFT engine to operate on a given set of input samples (i.e. the total run time) is also critical as the less number of clock cycles it takes, the less the power consumption. With regard to the FFT/IFFT engine, it would therefore be desirable to reduce the number of multiplier modules required while at the same time minimizing the number of clock cycles required to compute the FFT/IFFT.

The present invention pertains to symbolic or mathematical manipulation of the FFT formula in order to derive an optimal hardware implementation. The invention involves restructuring the FFT formula to minimize the number of clock cycles required while at the same time minimizing the number of complex multiplier modules. Since both the FFT and IFFT operations involve the same type of computations, only a discussion on the IFFT is presented. Those skilled in the art will appreciate that the formulation presented applies equally to an efficient implementation of the FFT operation.

The computational problem for the IFFT is to compute the sequence Y(n) of N complex-valued numbers given another sequence of data X(k) according to the formula $$Y(n) = \frac{1}{N}\sum_{k=0}^{N-1} X(k)e^{\frac{j2kn\pi}{N}} \quad 0 \le n \le N-1 \quad \text{equation(1)}$$

In the above formulation, one can see that for each sample n, direct computation of Y(n) involves N complex multiplications (4N real multiplications). Consequently, to compute the IFFT of all N samples, the IFFT requires $N^2$ complex multiplications.

FIG. 1 depicts one possible hardware implementation of equation (1). In FIG. 1, N complex-valued numbers defining the input sequence X(k) are fed into a multiplexer (MUX) 120. The MUX 120 selects one of the N complex-valued inputs and delivers it to a complex multiplier 140. The complex multiplier 140 is adapted to access to a look-up table (LUT) 150 which contains the values $$e^{\frac{j2kn\pi}{N}}$$

for some value N, $0 \leq k \leq N-1$ and $0 \leq n \leq N-1$. The output of the complex multiplier 140 is fed to an accumulation module 180 which may comprise a register 160. Using a single complex multiplier 140 as in FIG. 1, it is readily seen that the computation of each output sample requires N complex multiplications and, hence, the use of the complex multiplier 140 N times. In other words, to compute each output time sample, the results of N complex multiplications are added and accumulated in the register. This process will have to repeat itself for each of the N input samples to derive the N output time samples. Since N output samples in total need to be computed, this results in a total runtime of $N^2$ clock cycles (assuming one complex multiplication per clock cycle) to compute the IFFT for the entire input sequence Y(n).

However, computation of the IFFT using the brute force hardware implementation of FIG. 1 is inefficient primarily because it does not exploit the symmetry and periodicity properties of the phase factor, $e^{j\theta}$, in equation (1). The present invention exploits these properties to minimize the total run time (number of clock cycles) for computing the IFFT/FFT of a given set of sample data.

Those skilled in the art will appreciate that Equation (1) may be rewritten as the expansion $$Y(n) = \sum_{k=0}^{3} X\left(\frac{N}{4}k\right)e^{\frac{jkn\pi}{2}} + \sum_{k=0}^{3} X\left(\frac{N}{4}k+1\right)e^{j\left(\frac{k}{2}+\frac{2}{N}\right)n\pi} + \quad \text{equation (1a)}$$

$$\ldots + \sum_{k=0}^{3} X\left(\frac{N}{4}k + \frac{N}{4} - 1\right)e^{j\left(\frac{k}{2}+\frac{2}{N}\left(\frac{N}{4}-1\right)\right)n\pi}$$

or $$Y(n) = e^{\frac{j2n\pi}{N}(0)} \sum_{k=0}^{3} X\left(\frac{N}{4}k+0\right)e^{\frac{jkn\pi}{2}} + \quad \text{equation (1b)}$$

$$e^{\frac{j2n\pi}{N}(1)} \sum_{k=0}^{3} X\left(\frac{N}{4}k+1\right)e^{\frac{jkn\pi}{2}} + \ldots +$$

$$e^{\frac{j2n\pi}{N}\left(\frac{N}{4}-1\right)} \sum_{k=0}^{3} X\left(\frac{N}{4}k + \frac{N}{4} - 1\right)e^{\frac{jkn\pi}{2}}$$

Simplifying the above yields, $$Y(n) = \sum_{l=0}^{\frac{N}{4}-1} e^{\frac{j2ln\pi}{N}} \sum_{k=0}^{3} X\left(\frac{N}{4}k+l\right)e^{\frac{jkn\pi}{2}} \quad \text{equation (2)}$$

If we let $$P_l(n) = e^{\frac{j2ln\pi}{N}} \quad \text{equation (3)}$$

and $$G_l(n) = \sum_{k=0}^{3} X\left(\frac{N}{4}k+l\right)e^{\frac{jkn\pi}{2}} \quad \text{equation (4)}$$

the set of output samples may be written as $$Y(n) = \sum_{l=0}^{\frac{N}{4}-1} P_l(n)G_l(n) \quad \text{equation (5)}$$

Letting $$R_l(n) = P_l(n)G_l(n) \quad \text{equation (6)}$$

equation (5) may be written as $$Y(n) = \sum_{l=0}^{\frac{N}{4}-1} R_l(n) \quad \text{equation (7)}$$

Figure 2:
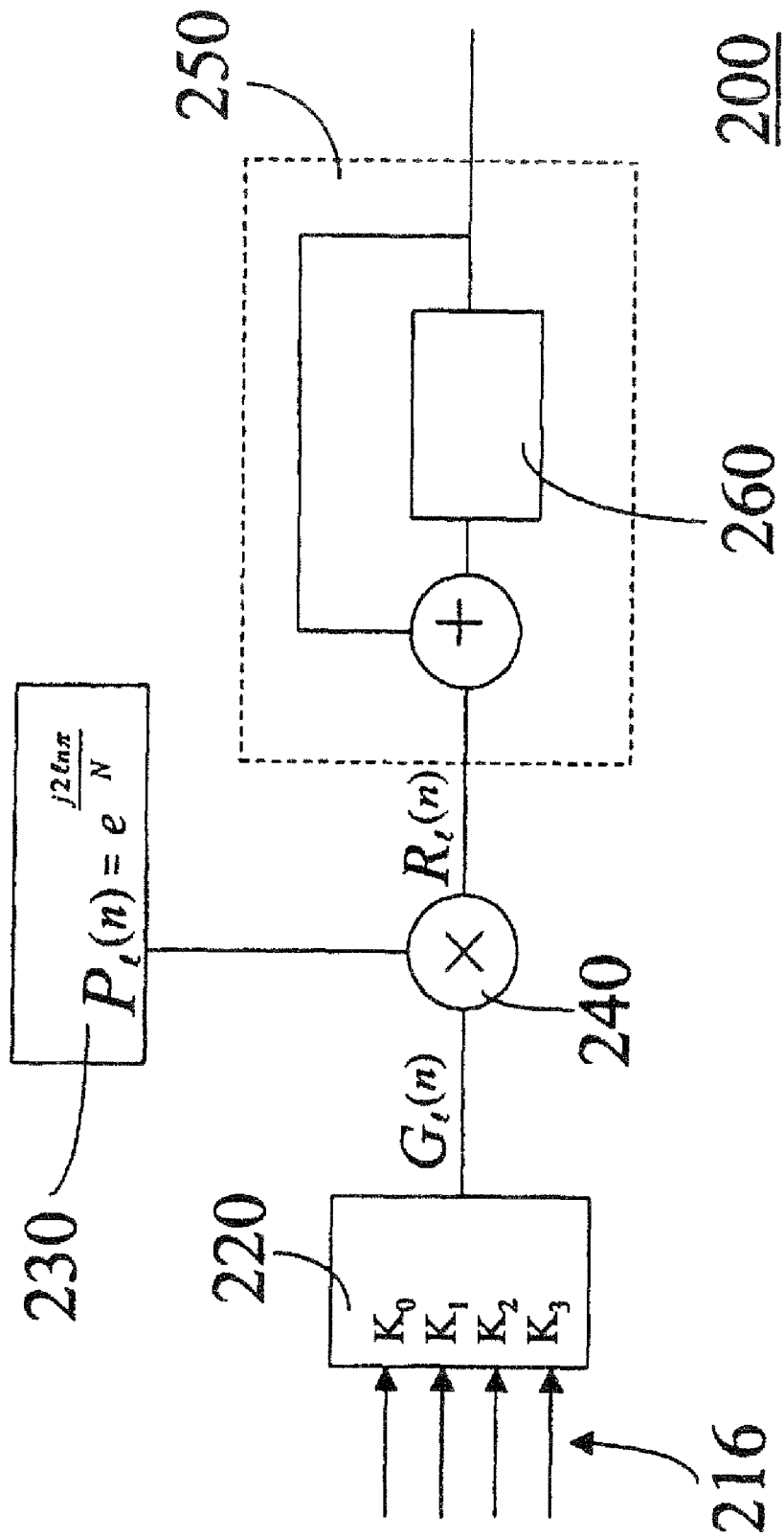
FIG. 2 depicts a partially optimized hardware implementation for the FFT/IFFT operation.

FIG. 2 depicts a hardware implementation for equation (5) above. Incoming complex numbers 216 arrive in groups of four at input ports (K0, K1, K2 and K3) of a $G_l(n)$ module 220. Assuming N input samples, the four incoming complex samples of each group will have indices $$\frac{N}{4}$$

apart. For example, the first group of incoming samples would be X(0), X(0+N/4), X(0+2N/4) and X(0+3N/4). Similarly, the second group of incoming samples would be X(1), X(1+N/4), X(1+2N/4) and X(1+3N/4). The output of the $G_l(n)$ module 220 is delivered to a complex multiplier 240 which is adapted to access a look-up table (LUT) 230 containing complex-valued constants $P_l(n)$ as defined by equation (3). The output $R_l(n)$ of the complex multiplier 240 is the product $G_l(n)$ with $P_l(n)$ as defined by equation (6). This product is sent to the accumulation module 250 which may comprise a register 260 as shown.

Examining equation (4), it may be shown that the function of the $G_l(n)$ module 220 is to simply take the four incoming complex numbers 216 (with indices N/4 apart), multiply each one by a constant $$e^{\frac{jkn\pi}{2}}$$

and add them all. It may be shown that the value of the constant $$e^{\frac{jkn\pi}{2}}$$

in equation (4) reduces to +1, −1, +j or −j depending on the values of k and sample number n. Therefore, no complex multiplications are conducted in this module.

Considering the implementation in FIG. 2 and keeping equation (5) in mind, those skilled in the art will appreciate that $$\frac{N}{4}$$

complex multiplications of $P_l(n) \times G_l(n)$ are required for the computation of each output sample. The results of these multiplications may then be added together in the accumulation module 250 to obtain each output sample. Therefore, a single output is generated every $$\frac{N}{4}$$

clock cycles. Since N outputs need to be computed, the total run time required to compute the FFT/IFFT for a set of N input samples using the implementation in FIG. 2 with one complex multiplier has been reduced from $N^2$ clock cycles to $$\frac{N^2}{4}$$

clock cycles. Although the reduction in total run time from $N^2$ clock cycles in FIG. 1 to $$\frac{N^2}{4}$$

clock cycles in FIG. 2 is an improvement, further optimization may be made by exploiting the periodicity of the phase factor, $e^{j\theta}$, in functions $P_l(n)$ and $G_l(n)$.

For example, substituting (n+4) for n in equation (4) for $G_l(n)$ yields, $$G_l(n+4) = \sum_{k=0}^{3} X\left(\frac{N}{4}k+l\right)e^{jk(n+4)\frac{\pi}{2}} \qquad \text{equation (8)}$$

$$= e^{jk2\pi} \sum_{k=0}^{3} \left(\frac{N}{4}k+l\right)e^{\frac{jkn\pi}{2}}$$

or $$G_l(n+4) = e^{jk2\pi} G_l(n) = G_l(n) \qquad \text{equation (9)}$$

Similarly, substituting (n+4) for n in equation (3) for $P_l(n)$ yields, $$P_l(n+4) = e^{\frac{j2l(n+4)\pi}{N}} \qquad \text{equation (10)}$$

$$= e^{\frac{j2ln\pi + j8l\pi}{N}}$$

$$= e^{\frac{j2ln\pi}{N}} \cdot e^{\frac{j8l\pi}{N}}$$

or $$P_l(n+4) = e^{\frac{j8l\pi}{N}} P_l(n) \qquad \text{equation (11)}$$

Substituting equation (11) and equation (9) into equation (6), it may be shown that $$R_l(n+4) = P_l(n+4)G_l(n+4) \qquad \text{equation (12)}$$

$$= e^{\frac{j8l\pi}{N}} P_l(n)G_l(n)$$

$$= e^{\frac{j8l\pi}{N}} R_l(n)$$

The relationship defined by equation (12) states that, for a given value of l, the function $R_l(n)$ for any given output sample is a phase rotation of the computed functions' value four output samples before. Previously, each output sample required $$\frac{N}{4}$$

computations of $R_l(n)$ which were then summed to arrive at a given output sample. With $R_l(n)$ displaying the recursive relationship defined by equation (12), each output sample still requires $$\frac{N}{4}$$

computations of $R_l(n)$. However, once the first four output samples i.e. Y(0), Y(1), Y(2), (3) are computed in N clock cycles (i.e. N computations), the values of $R_l(n)$ required to compute all other output samples are simply phase rotations of the previously calculated $R_l(n)$ values. In other words, the number of clock cycles required for the entire FFT/IFFT operation is reduced to N.

In terms of simplifying a hardware implementation, a variable β can be defined with β being a multiple of 4. Then, the following relation can be shown to hold $$R_l(n+\beta) = e^{\frac{j2\beta l\pi}{N}} R_l(n) \qquad \text{equation (13)}$$

Accordingly, equation (7) may be rewritten as $$Y(n+\beta) = \frac{1}{N} \sum_{l=0}^{\frac{N}{4}-1} R_l(n+\beta) \qquad \text{equation (14)}$$

$$= \frac{1}{N} \sum_{l=0}^{\frac{N}{4}-1} P_l(n+\beta)G_l(n+\beta)$$

or $$Y(n+\beta) = \frac{1}{N}\sum_{l=0}^{\frac{N}{4}-1} R_l(n)e^{\frac{j2\beta l\pi}{N}}$$

equation (15)

Those skilled in the art will appreciate that only the first $$\frac{N}{16}$$

products in equation (15) require complex multiplications to be performed. For all other values of l, the product in equation (15) can be found by a trivial multiplication of one of the first $$\frac{N}{16}$$

products. Accordingly, $$\left(\frac{N}{16}+1\right)$$

complex multipliers are now required to perform the FFT/IFFT operation in N clock cycles. Although the number of clock cycles to perform the FFT/IFFT operation has been reduced by an order of magnitude from $N^2$ to N, this has been at the expense of adding $$\frac{N}{16}$$

more complex multipliers. However, the number of complex multipliers required may be further reduced using a very useful property as described below.

In the general case, let us define a first complex number A=x+jy with real part x and imaginary part y and a second complex number B=y+jx where B is the reflection of A about the 45 degree line in the unit circle. For complex numbers A and B each multiplied by a third complex number Z=R+jM, the following products are obtained:

$$A \times Z = (xR - My) + j(Ry + Mx)$$ equation (16)

$$B \times Z = (Ry - Mx) + j(My + Rx)$$ equation (17)

Examining equations (16) and (17) it is observed that all inner products (real multiplications) for both complex multiplications may be obtained by only carrying out one of the original complex multiplications. In other words, by computing A×Z, no new multiplications are required to compute B×Z. Computing B×Z is simply a matter of rearranging the way the different inner products from A×Z are added or subtracted. This useful property, called Image Multiplication (since B is a mirror image of A about the 45-degree line in the unit circle), may be exploited to halve the number of complex multipliers determined previously.

Specifically, to compute all possible products $$R_l(n) \cdot e^{\frac{j2\beta l\pi}{N}}$$

in equation (15), only $$\frac{N}{32}$$

multipliers are required. Since one additional multiplier is required to compute $R_l(n)$ itself, the total number of complex multipliers required is $$\left(\frac{N}{32}+1\right).$$

Therefore, in accordance with an aspect of the present invention, the total number of clock cycles required for computing an N-point FFT/IFFT can reduced by an order of magnitude from $N^2$ to N by using only $$\left(\frac{N}{32}+1\right)$$

complex multipliers.

According to an embodiment of the present invention, it is assumed that a 64-point FFT/IFFT operation is required i.e. N=64. In this case, equation (15) reduces to $$Y(n+\beta) = \frac{1}{64}\sum_{l=0}^{15} R_l(n)e^{\frac{j\beta l\pi}{32}}$$

equation (18)

where β is a multiple of 4 and 0<β≦60. Examining equation (18) above and noting that β is a multiple of 4, it is clear that in order to compute the IFFT/FFT, the multiplication of $R_l(n)$ with only three complex numbers $$e^{\frac{j4\pi}{32}}, e^{\frac{j8\pi}{32}} \text{ and } e^{\frac{j12\pi}{32}}$$

is required. All other multiplications simply entail multiplying one of these products by 1, −1, j or −j.

Figure 3:
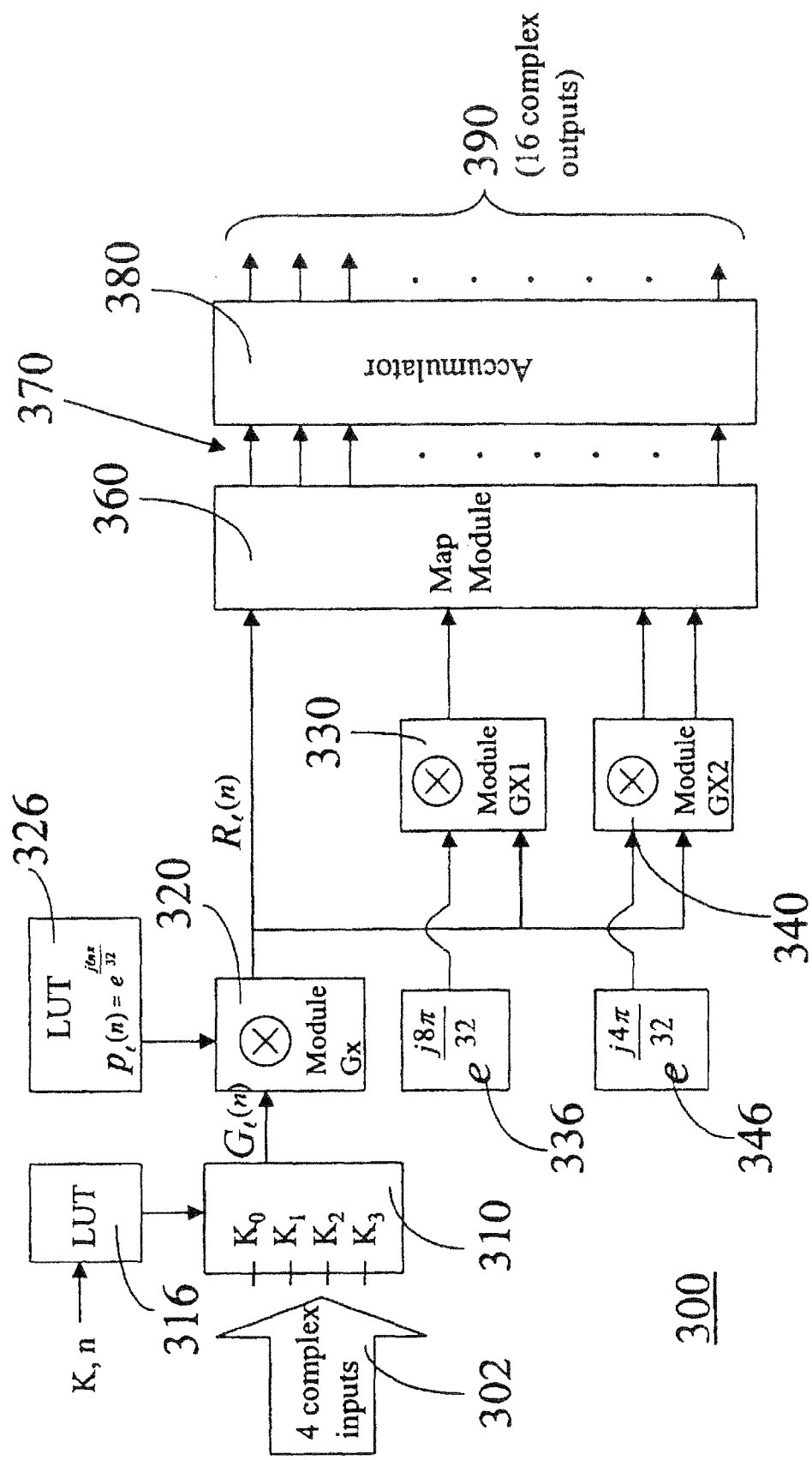
FIG. 3 depicts a fully optimized hardware implementation for the FFT/IFFT operation according to the present invention.

FIG. 3 depicts an optimized hardware implementation 300 of the 64-point IFFT/FFT operation defined by equation (18) in accordance with one aspect of the present invention. A first G module 310 having four input ports K0, K1, K2, and K3 receives four complex-valued input samples and is adapted to access a first look up table (LUT) 316. An output $G_l(n)$ of the G module 310 is delivered to a first complex multiplier module GX 320 which is adapted to access a second look-up table (LUT) 326. The output $R_l(n)$ of the first complex multiplier module GX 320 is delivered to a MAP module 360. An output $R_l(n)$ of the first complex multiplier module GX 320 is further routed to a second complex multiplier module GX1 330 and to a third complex multiplier module GX2 340. The second multiplier module GX1 330 is adapted to access a first storage unit 336 containing a predefined complex-valued constant and delivers its output to the MAP module 360. Similarly, the third multiplier module GX2 340 is adapted to access a second storage unit 346 containing a predefined complex-valued constant and delivers two outputs to the MAP module 360. The MAP module 360 generates a set of sixteen outputs 370 which are subsequently delivered to an accumulation module 380. The accumulation module 380 generates a set of sixteen outputs 390 corresponding to sixteen output time/frequency samples. In the implementation of FIG. 3, therefore, sixteen output samples are generated at any given time from sixty-four input samples.

The G module 310 is the first module to receive incoming complex numbers. As in FIG. 2, the G module 310 has four input ports (K0, K1, K2 and K3) and simply takes four incoming complex-valued samples 302 with indices being sixteen (N/4) apart, multiplies each one by a constant (+j, −j, +1 or −1) and adds them to form the output $G_l(n)$.

Specifically, four new complex numbers get latched into this module during each clock cycle. In order to load all 64 input samples for a 64-point IFFT/FFT computation, sixteen clock cycles are required. Since sixteen output samples 390 are generated at the output of the entire IFFT/FFT block, the entire process is repeated 4 times to result in output time samples. A counter state n can thus be defined where n=0, 1, 2, 3 corresponding to the computation of each set of sixteen output samples.

Once four complex numbers are loaded, the G module 310 accesses the look up table (LUT) 316 to obtain appropriate multiplication factors for each complex number. The multiplication factor for each complex number may take on one of four possible values: +1, −1+j or −j. For each complex number, the multiplication is performed on both real and imaginary parts. The results are then added to generate the output $G_l(n)$ which is pushed to the output port. This process must be repeated sixteen times (l ranging from 0 to 15) in order to generate the sixteen $G_l(n)$ values necessary for each output sample.

In one implementation, the look-up table (LUT) 316 accessed by the G module 310 can have sixteen entrees. Two stimulus variables, namely the port number (0, 1, 2 or 3) and counter state n may then be used to define the value of the multiplication factor. A single local controller (not shown) may be used to select one set of multiplication factors from the LUT 316 and subsequently push them to the G module 310. Since the multiplication factors selected from the LUT 316 are determined by the two stimulus variables, the LUT 316 may take the form of a truth table.

The output $G_l(n)$ of the G module 310 is delivered to the GX Module 320. The GX module 320 is a complex multiplier used to generate $R_l(n)$ from $G_l(n)$. The output of this module may be described by the complex product $$\left[\cos\left(\frac{ln\pi}{32}\right) + j\sin\left(\frac{ln\pi}{32}\right)\right] \times \text{output from } G \text{ module}$$

where two global input variables are defined as before with n ranging from 0 to 3 and l ranging from 0 to 15. The GX module 320 performs a complex number multiplication of its received input $G_l(n)$ by a complex-valued constant, $$P_l(n) = e^{\frac{jln\pi}{32}},$$

where values for $P_l(n)$ are stored in the corresponding look-up table (LUT) 326.

In a specific implementation, the LUT 326 may comprise eight predefined values i.e.

$$e^{\frac{j\pi}{32}}, e^{\frac{j2\pi}{32}} \ldots e^{\frac{j8\pi}{32}}$$

hard coded into the LUT block. Generating these eight constants is sufficient since all other constants can be easily derived based on these constants and the application of an appropriate multiplication factor. Based on the value of the product l×n, one of the eight values is selected. The next step is to determine the multiplication factor which can be one of four possible numbers: +1, −1, +j, or −j. In this manner, any constant $$P_l(n) = e^{\frac{jln\pi}{32}}$$

may be derived by performing a simple multiplication of a selected one of the eight values in the LUT 326 by an appropriate multiplication factor. The output $R_l(n)$ of the GX module 320 is subsequently delivered to the MAP module 360. The output $R_l(n)$ is also routed to the GX1 module 330 and to the GX2 module 340.

The GX1 module 330 is a complex multiplier used to perform the complex multiplication of its received input $R_l(n)$ by a fixed complex-valued constant $$e^{\frac{j8\pi}{32}}.$$

Mathematically, the output of the GX1 module 330 may be described by the following product:

$$\left[\cos\left(\frac{8\pi}{32}\right) + j\sin\left(\frac{8\pi}{32}\right)\right] \times \text{output from } GX \text{ module}$$

The GX1 module is adapted to access the storage unit 336 to obtain the complex-valued constant, $$e^{\frac{j8\pi}{32}}.$$

The output of the GX1 module 330 is delivered to the MAP module 360.

The GX2 module 340 is also a complex multiplier used to perform the complex multiplication of its received input $R_l(n)$ by two fixed complex valued constants $$e^{\frac{j4\pi}{32}} \text{ and } e^{\frac{j12\pi}{32}}.$$

Mathematically, the function of this module may be described by the following products:

$$\left[\cos\left(\frac{4\pi}{32}\right) + j\sin\left(\frac{4\pi}{32}\right)\right] \times \text{output from } GX \text{ module}$$

$$\left[\cos\left(\frac{12\pi}{32}\right) + j\sin\left(\frac{12\pi}{32}\right)\right] \times \text{output from } GX \text{ module}$$

The GX2 module 340 receives the output $R_l(n)$ of the GX module 320 and is also adapted to receive the fixed constant $$e^{\frac{j4\pi}{32}}$$

from the corresponding storage unit 346. Those skilled in the art will appreciate that $$e^{\frac{j4\pi}{32}}$$

is the same as $$e^{\frac{j12\pi}{32}}$$

with the real and imaginary components reversed. Therefore, by multiplying $R_l(n)$ with $$e^{\frac{j4\pi}{32}},$$

the product of $R_l(n)$ by $$e^{\frac{j12\pi}{32}}$$

may be obtained by manipulating the result of the first product thereby eliminating the need to perform an extra multiplication. Specifically, the second product $$R_l(n) \times e^{\frac{j12\pi}{32}}$$

may be obtained simply by rearranging the manner in which the inner products resulting from the first product i.e.

$$R_l(n) \times e^{\frac{j4\pi}{32}}$$

are added or subtracted. The results of these two products are then delivered to the MAP module 360. Once the products of the three complex multiplications performed by the GX module 320, the GX1 module 330 and the GX2 module 340 are generated, they are sent to the MAP module 360 where the product of $$R_l(n) \text{ by } e^{\frac{j\beta l\pi}{32}}$$

for any value of β (multiple of 4) and l (integer) can be predicted.

The mathematical function performed by the MAP module 360 is to compute the sixteen component values $$R_l(n) \cdot e^{\frac{jl\beta\pi}{32}}$$

with l ranging from 0 to 15, for each required output time sample. The MAP module 360 in FIG. 3 is adapted to receive four inputs corresponding to the complex products computed by the complex multiplier modules 320, 330 and 340. In the embodiment of FIG. 3, the MAP module 360 has sixteen outputs corresponding to sixteen distinct output samples.

Each input port of the MAP module 360 receives a unique complex number, $R_l(n)$, multiplied by a certain constant $$\left(1, e^{\frac{j4\pi}{32}}, e^{\frac{j8\pi}{32}} \text{ or } e^{\frac{j12\pi}{32}}\right).$$

Figure 4:
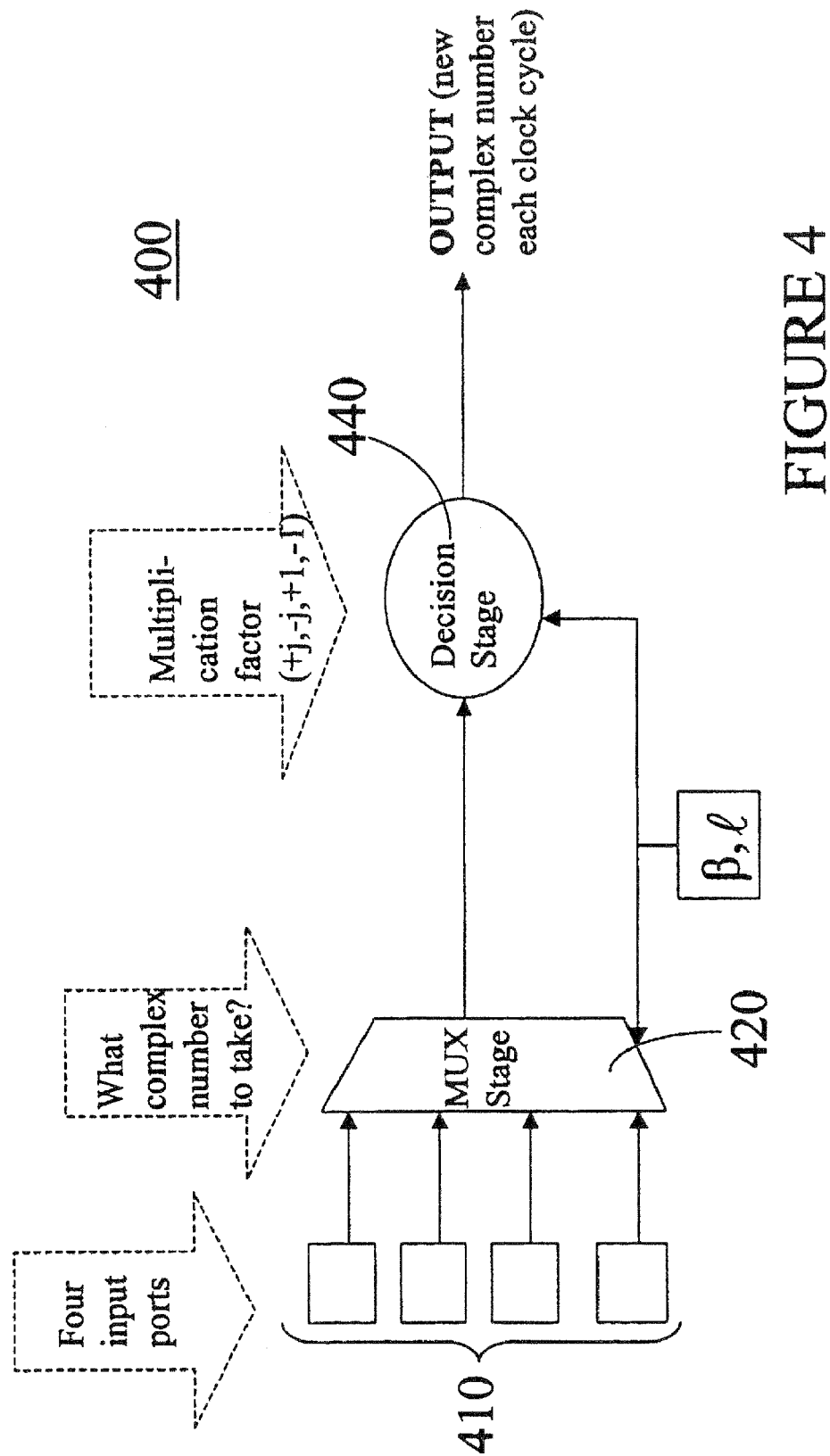
FIG. 4 depicts an example of the logic flow undertaken by the MAP module of FIG. 3 in accordance with one aspect of the present invention.

For each value of l with l ranging from 0 to 15, sixteen component products defined by $$R_l(n) \cdot e^{\frac{j\beta l\pi}{32}}$$

and corresponding to different output time samples (granularity of 4) need to be computed and delivered to the output ports. However, out of the sixteen component products which need computing, four have already been computed. These are simply the four complex-valued inputs to the MAP module 360. From these four inputs, any of the required sixteen component products may be generated by a simple multiplication of one of the four inputs by +1, −1, +j or −j. FIG. 4 depicts an example of the logic flow 400 which may be undertaken in the MAP module 360 to arrive at one of sixteen component products. As shown, a MUX stage 420 receives the 4 inputs from modules GX, GX1 and GX2. Depending on the output port (β) of the MAP module 360 being considered and the value of l, a complex product from one of the four input ports is selected and forwarded to a Decision stage 440 where an appropriate multiplication factor is applied. This process is implemented for each output port of the MAP module 360. The sixteen outputs 370 of the MAP module are subsequently delivered to the accumulation module 380 whose functionality is described below.

Figure 5:
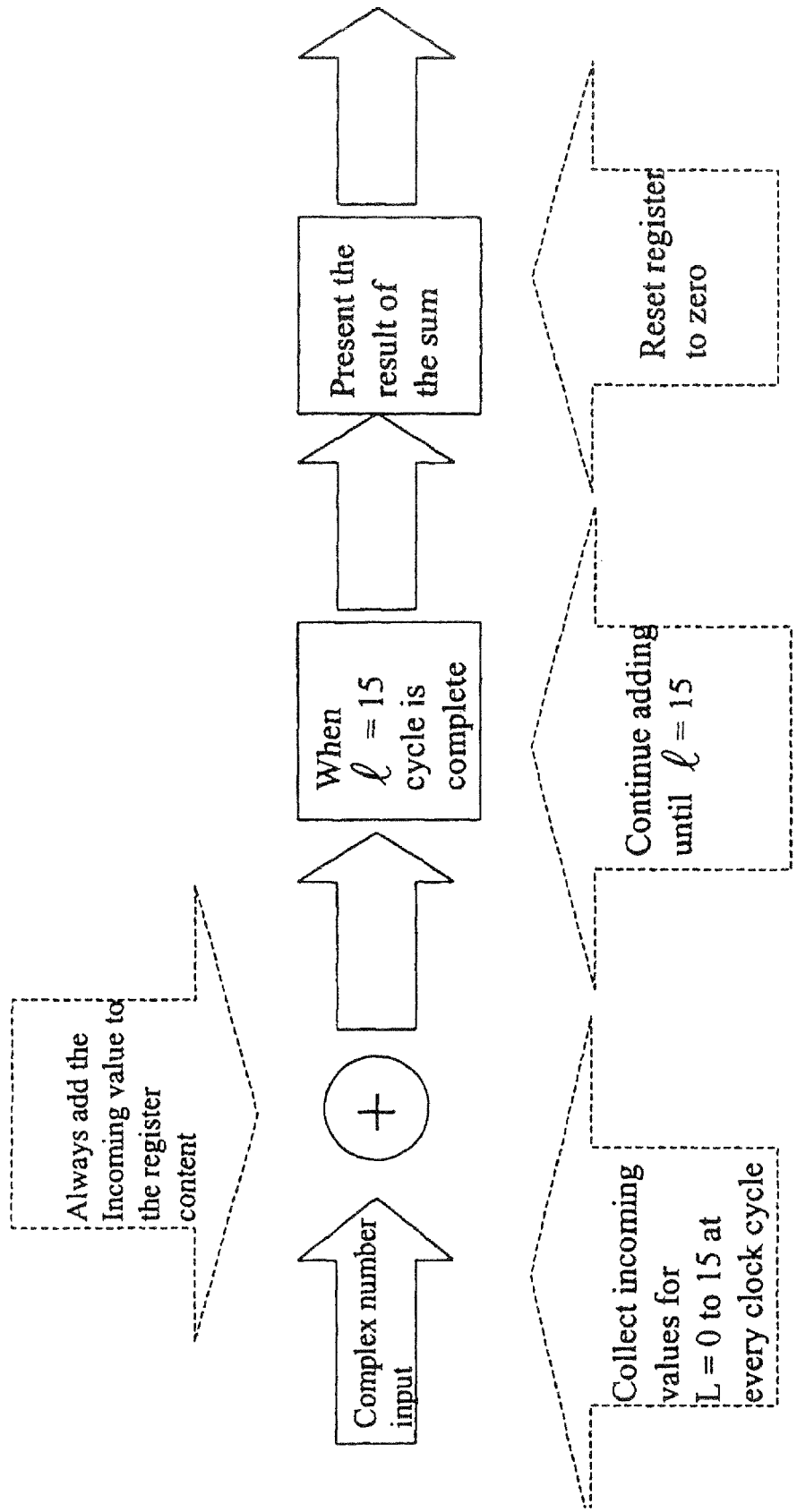
FIG. 5 depicts the general operation of the accumulation module of FIG. 3 in accordance with one aspect of the present invention.

The accumulation module 380 receives sixteen inputs from the MAP module 360. For each given input port, sixteen incoming complex numbers (these are the component values corresponding to values of equation (18) for l ranging from 0 to 15) arrive every clock cycle to be summed together in a register in order to generate one single output sample. This process occurs for each of sixteen input ports resulting in sixteen output time samples being computed in parallel. After the sixteen component values are summed for each input, the registers are cleared and the process is repeated for computation of the next set of sixteen output time samples. A general depiction of the operation performed by the accumulation module 380 is shown in FIG. 5.

According to the embodiment in FIG. 3, using three (3) complex multipliers allows for the generation of 16 output samples every 16 clock cycles. Therefore, the total run time for applying the IFFT/FFT operation on the 64 complex-valued input samples would be 64 clock cycles. With regard to the brute force implementation depicted in FIG. 1, at the expense of adding two complex multipliers, the total number of clock cycles required to compute the 64-point FFT/IFFT has been reduced by an order of magnitude from $(64)^2$ to 64.

Due to the similarity between the forward and inverse FFT (the IFFT differs from the FFT only by the sign of the exponent), the same module or circuitry with trivial modifications can be used for both modulation and demodulation in an OFDM transceiver. Although not shown, it should also be noted that depending on if the FFT or IFFT is to be computed, the accumulation module 380 treats its addition results differently. If the IFFT operation is required, the final result of the addition for each output sample is divided by the total number of samples (i.e. N). In the embodiment of FIG. 3 and assuming the IFFT operation is desired, for example, the results of each accumulation would be divided by 64. If the FFT operation is desired, there is no division.

The advantage of an FFT/IFFT engine implemented with ASIC technology is that each of the functional blocks of the FFT/IFFT engine be mapped onto dedicated, parallel hardware resources thereby avoiding the difficult programming and optimization challenges of scheduling time-critical operations through a single DSP core.

It should be noted that the LUTs and other modules which provide multiplicands to the complex multiplier modules can be termed as multiplicand generators as they provide multiplicands for the system.

While preferred embodiments of the invention have been described and illustrated, it will be apparent to one skilled in the art that numerous modifications, variations and adaptations may be made without departing from the scope of the invention as defined in the claims appended hereto.

Although various exemplary embodiments of the invention have been disclosed, it should be apparent to those skilled in the art that various changes and modifications can be made which will achieve some of the advantages of the invention without departing from the true scope of the invention.

A person understanding this invention may now conceive of alternative structures and embodiments or variations of the above all of which are intended to fall within the scope of the invention as defined in the claims that follow.

I claim:

1. A system comprising a processing device for performing an N-point FFT/IFFT operation, where N is the number of the input samples, the system further comprising:
   an input circuit configured to combine a plurality of inputs after applying a multiplication factor to each of the plurality of inputs;
   at least one multiplicand generator circuit configured to generate at least one multiplicand;
   at least two multiplier circuits configured to perform complex multiplications using the at least one multiplicand on at least one of an output of the input circuit and an output of one of the at least two multiplier circuits;
   a map circuit configured to apply a multiplication factor to outputs of the at least two multiplier circuits to thereby generate multiple outputs; and
   an accumulation circuit configured to accumulate the multiple outputs of the map circuit.

2. The system according to claim 1 where the at least two multiplier circuits comprises $$\frac{N}{32} + 1$$

multiplier circuits.

3. The system according to claim 1 where the system is configured to complete the N-point FFT/IFFT operation in N clock cycles.

4. The system according to claim 1 where the accumulation circuit is configured to generate multiple outputs corresponding to the multiple outputs received from the map circuit.

5. The system according to claim 1 where the at least one multiplicand generator comprises at least one look-up table (LUT).

6. The system according to claim 1 where the at least one multiplicand generator comprises at least one truth table.

7. A system comprising a processing device for performing Fast Fourier Transform/Inverse Fast Fourier Transform (FFT/IFFT) operations, the system further comprising:
   a first summing means for combining a plurality of inputs after applying a first set of multiplication factors;
   a first storage means for storing the first set of multiplication factors;
   a first complex multiplier means for applying a first multiplicand to an output of the first summing means;
   a first multiplicand generator means for generating the first multiplicand;
   a second complex multiplier means for applying a second multiplicand to an output of the first complex multiplier means;
   a second multiplicand generator means for generating a second multiplicand;
   a third complex multiplier means for applying a third multiplicand to an output of the first complex multiplier means to thereby generate a first output of the third complex multiplier means and for applying an image of the third multiplicand to the output of the first complex multiplier means to thereby generate a second output of the third complex multiplier means;
   a third multiplicand generator means for generating the third multiplicand;
   a map means for applying a second set of multiplication factors to selected outputs of the first, second, and third complex multiplier means; and
   an accumulation means for accumulating each output of the map means.

8. The system according to claim 7 where the first set of multiplication factors is chosen from the set comprising +1, −1, +j or −j.

9. The system according to claim 7 where the first storage means comprises a look-up table (LUT) means.

10. The system according to claim 7 where the first storage means comprises a truth table means.

11. The system according to claim 7 where the first multiplicand generator comprises a look-up table (LUT) means.

12. The system according to claim 7 where first multiplicand generator means comprises a truth table means.

13. The system according to claim 7 where the second multiplicand includes $$e^{\frac{j8\pi}{32}}.$$

14. The system according to claim 7 where the third multiplicand includes $$e^{\frac{j4\pi}{32}}.$$

15. The system according to claim 7 where the image of the third multiplicand includes $$e^{\frac{j12\pi}{32}}.$$

16. The system according to claim 7 where the second set of multiplication factors is chosen from the set comprising +1, −1, +j or −j.

17. A method comprising:
combining, using a processing device, a plurality of inputs after applying a first set of multiplication factors to generate a first combined output;
applying, using the processing device, a first multiplicand to the first combined output to generate a first multiplied output;
applying, using the processing device, a second multiplicand to the first multiplied output to generate a second multiplied output;
applying, using the processing device, a third multiplicand to the first combined output to generate a third multiplied output;
applying, using the processing device, an image of the third multiplicand to the first multiplied output to generate a fourth multiplied output;
applying, using the processing device, a second set of multiplication factors to selected ones of the first, second, third, and fourth multiplied outputs; and
accumulating, using the processing device, the selected ones of the first, second, third, and fourth multiplied outputs responsive to the applying the second set of multiplication factors.

18. The method of claim 17 comprising storing the first, second, and third multiplicand.

19. The method of claim 17 where the first set of multiplication factors is chosen from the set comprising +1, −1, +j or −j.

20. The method of claim 17 comprising storing the first set of multiplication factors in a look-up table (LUT).

21. The method of claim 17 comprising storing the first set of multiplication factors in a truth table.

22. The method of claim 17 comprising generating the first multiplicand using a look-up table (LUT).

23. The method of claim 17 comprising generating the first multiplicand using a truth table.

24. The method of claim 17 comprising generating the second multiplicand as $$e^{\frac{j8\pi}{32}}.$$

25. The method of claim 17 comprising generating the second multiplicand as $$e^{\frac{j4\pi}{32}}.$$

26. The method of claim 17 comprising generating the image of the third multiplicand as $$e^{\frac{j12\pi}{32}}.$$

27. The method of claim 17 comprising generating the second set of multiplication factors from the set comprising +1, −1, +j or −j.

* * * * *